May 4, 1926.
C. C. FARMER
BRAKE PIPE VENTING DEVICE
Filed June 24, 1924
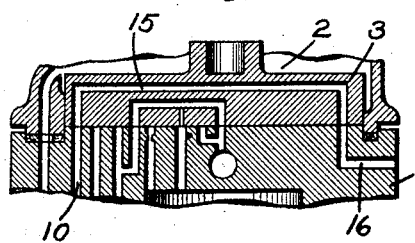
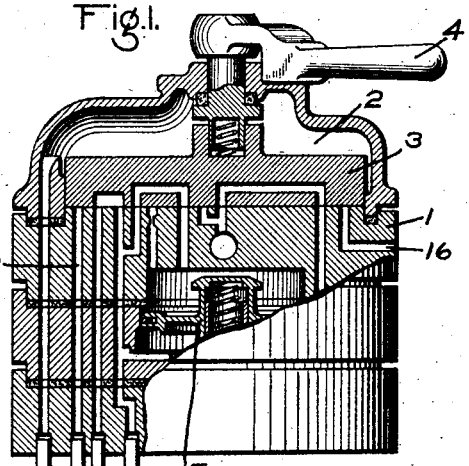
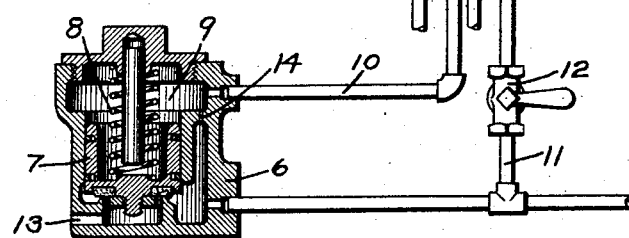
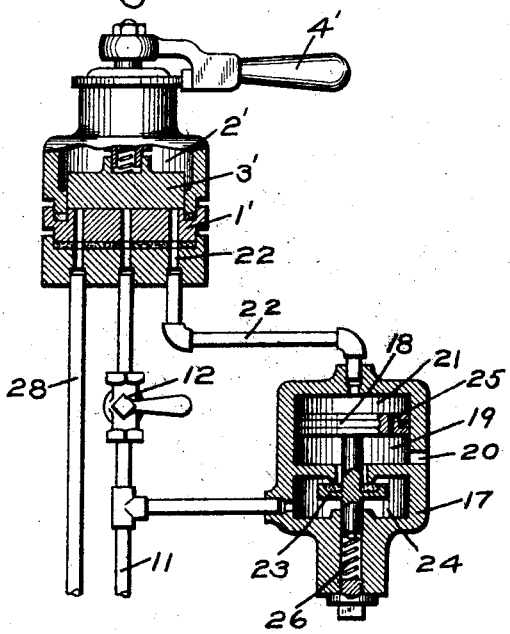
INVENTOR
CLYDE C. FARMER
BY *Wm. M. Cady*
ATTORNEY Patented May 4, 1926.

1,582,916

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-PIPE-VENTING DEVICE.

Application filed June 24, 1924. Serial No. 722,019.

*To all whom it may concern:*

Be it known that I, CLYDE C. FARMER, a citizen of the United States, residing at Pittsburgh, in the county of Allegheny and State of Pennsylvania, have invented new and useful Improvements in Brake-Pipe-Venting Devices, of which the following is a specification.

This invention relates to fluid pressure brakes, and more particularly to a brake valve device having an emergency position in which fluid under pressure is vented from the brake pipe to effect an emergency application of the brakes.

The principal object of my invention is to provide means controlled by the brake valve for venting fluid from the brake pipe in an emergency application at a greater rate than fluid is vented by the usual emergency port in the brake valve.

In the accompanying drawing; Fig. 1 is a sectional view of a brake valve device, showing my invention applied thereto; Fig. 2 a sectional view of the brake valve shown in Fig. 1, with the rotary valve in emergency application position; Fig. 3 a sectional view of a slightly modified form of my invention; and Fig. 4 a sectional view of the brake valve shown in Fig. 3, with the rotary valve in emergency application position.

As shown in Fig. 1, the brake valve device may comprise a casing 1 having a valve chamber 2 containing a rotary slide valve 3, adapted to be operated by handle 4, the casing also containing the usual equalizing discharge valve mechanism 5, as shown in part in Fig. 1.

According to my invention, a valve device is provided comprising a casing 6 containing a valve piston 7, subject on one side to the pressure of a coil spring 8 and having the spring chamber 9 connected to a pipe and passage 10, leading to the seat of rotary valve 3. The usual brake pipe 11 is connected, below the cut-out cock 12 to the chamber at the outer seated area of the valve piston 7, the inner seated area being connected to an atmospheric exhaust port 13.

In all positions of the rotary valve 3, except emergency position, the passage 10 is blanked, and fluid under pressure equalizes from the brake pipe 11 through a restricted port 14 to chamber 9, so that the valve piston is held seated by the spring 8 and the unbalanced fluid pressure due to the inner seated area of the valve piston being subject to atmospheric pressure.

When the brake valve handle is turned to emergency position, the rotary valve 3, as shown in Fig. 2, connects passage 10, through a cavity 15 in the valve, with an atmospheric exhaust port 16, so that fluid is vented from the chamber 9 of the valve piston 7, causing the fluid pressure from the brake pipe, which acts on the outer seated area of the valve piston, to effect the movement of same so as to open a large vent from the brake pipe to the atmosphere by way of port 13. By this means a rapid venting of fluid from the brake pipe to effect an emergency application of the brakes is effected.

On the second engine in double heading the cock 12 is closed so as to cut off communication from the brake pipe to the brake valve, but with the present construction, an emergency application can still be effected, as will be evident, by moving the brake valve handle to emergency position.

According to the construction shown in Fig. 3, a valve device is provided for effecting a rapid venting of fluid from the brake pipe as in the construction shown in Fig. 1, but in this instance the valve device is operated by admission of fluid under pressure instead of by venting fluid.

The valve device shown in Fig. 3 may comprise a casing 17 containing a piston 18 having the chamber 19 at one side of the piston open to an atmospheric exhaust port 20 and having chamber 21 at the opposite side of the piston connected to a pipe and passage 22, leading to the seat of the rotary valve 3'.

The piston 18 is operatively connected to a valve 23, which controls the venting of fluid from the brake pipe 11 and is contained in valve chamber 24.

In all positions of the rotary valve 3', except emergency application position, the passage 22 is blanked, permitting any fluid presure in chamber 21 to equalize through a restricted port 25 in piston 18 to chamber 19. The opposite sides of piston 18 being at atmospheric pressure, the spring 26 maintains the valve 23 seated.

When the brake valve handle 4' is turned to emergency position, the rotary valve 3' is turned so as to connect passage 22, through a cavity 27, with a fluid pressure supply pipe, such as the main reservoir pipe 28, so that fluid under pressure is supplied to piston chamber 21 and the piston 18 is thereby operated to effect the opening of the valve 23 and the consequent rapid venting of fluid from the brake pipe.

Having now described my invention, what I claim as new and desire to secure by Letters Patent, is:—

1. In a fluid pressure brake, the combination with a brake pipe and a brake valve device having an emergency application position, of a valve device including a piston subject on one side to brake pipe pressure and on the other side to pressure supplied from the brake pipe through a restricted port and means operated upon movement of the brake valve device to emergency position for venting fluid from one side of said piston to operate same and open a vent port to the brake pipe.

2. In a fluid pressure brake, the combination with a brake pipe and a brake valve device having an emergency application position, of a valve device including a piston, and valve means operated by said piston for controlling a large vent port to the brake pipe, said piston being subject on one side to the pressure in a chamber charged from the brake pipe through a restricted port and said chamber having a passage controlled by the brake valve device and adapted in emergency position to be connected to the atmosphere.

In testimony whereof I have hereunto set my hand.

CLYDE C. FARMER.